United States Patent
Suzuki

[11] Patent Number: 5,831,771
[45] Date of Patent: Nov. 3, 1998

[54] ZOOM LENS

[75] Inventor: Takeshi Suzuki, Kanagawa-ken, Japan

[73] Assignee: Nikon Corporation, Tokyo, Japan

[21] Appl. No.: 580,834

[22] Filed: Dec. 29, 1995

[30] Foreign Application Priority Data

Jan. 5, 1995 [JP] Japan ................................. 7-015532

[51] Int. Cl.⁶ .......................... G02B 15/14; G02B 3/02
[52] U.S. Cl. ...................... 359/689; 359/688; 359/715; 359/716
[58] Field of Search .................. 359/688, 715, 359/690, 692

[56] References Cited

U.S. PATENT DOCUMENTS

| 4,281,906 | 8/1981 | Tanaka | 359/688 |
| 5,204,779 | 4/1993 | Nakata | 359/688 |
| 5,543,970 | 8/1996 | Hata | 359/690 |

OTHER PUBLICATIONS

Patent Abstracts of Japan, Publication No. 07035976 A, Feb. 7, 1995.
Patent Abstracts of Japan, Publication No. 07035977 A, Feb. 7, 1995.
Patent Abstracts of Japan, Publication No. 07035978 A, Feb. 7, 1995.

*Primary Examiner*—David C. Nelms
*Assistant Examiner*—John P. Cornely
*Attorney, Agent, or Firm*—Oliff & Berridge

[57] ABSTRACT

A small, lightweight zoom lens has high imaging performance with a large aperture and a large zoom ratio. The zoom lens includes a first lens unit having positive power, a second lens unit having negative power, and a third lens unit having positive and negative power components. During zooming, the second lens unit moves along the optical axis and the first lens unit is fixed. At least one of the lens surfaces of the first or second lens units is aspheric. The first lens unit has at least one positive lens component with refractive index Nd+ and Abbe number υd+ that satisfies the following condition:

$Nd+ < 1.437$ $95 < υd+$.

36 Claims, 6 Drawing Sheets

ZOOM LENS

BACKGROUND OF THE INVENTION

1. Field of the Invention

The present invention relates to a zoom lens for TV cameras and similar imaging devices.

2. Description of Related Art

Conventionally, a zoom lens having a large aperture and a large zoom ratio has four lens units that have refractive powers of positive.negative.negative.positive or positive.negative.positive.positive in order from the object side. In such zoom lenses, the change in the focal length is accomplished from a maximum wide-angle state to a maximum telephoto state by moving the second and the third lens units along the optical axis.

When a zoom lens as described above has been used in a TV camera or a similar imaging device, because images have been input by a camera tube, some chromatic aberration has been correctable by the camera tube. However, correction of the chromatic aberration is impossible by a solid state imaging element that may be used instead of a camera tube. Therefore, the chromatic aberration has to be well corrected by the zoom lens.

Moreover, there is an increasing demand for a small, lightweight high performance zoom lens with a large aperture, a wide-angle setting, and a large zoom ratio. In general, the refractive power of each lens unit has been increased to assist in making the zoom lens small and lightweight. However, if the refractive powers of the lens units are simply increased, image performance decreases because of increased aberrations.

SUMMARY OF THE INVENTION

It is an objective of the present invention to provide a zoom lens that is small and lightweight and that is capable of high performance imaging with a large aperture and over a large zoom ratio.

A zoom lens according to the present invention includes, from the object side, a first lens unit having a positive refractive power, a second lens unit having a negative refractive power, and a third lens unit having lens components of positive and negative refractive power, wherein the second lens unit moves along the optical axis and the first lens unit is fixed along the optical axis during zooming from the maximum wide-angle state to the maximum telephoto state. Additionally, at least one of the lens surfaces in the first lens unit or the second lens unit is aspheric, the first lens unit includes at least one positive lens component, and the refractive index Nd+ and Abbe number υd+ of at least one positive lens component among the positive lens components of the first lens unit satisfies the following condition:

$$Nd+ < 1.437 \quad (1)$$

$$95 < υd+ \quad (2)$$

where the refractive index Nd+ and the Abbe number υd+ are determined at the d line (λ=587.6 nm).

Particularly, by using an anomalous dispersion glass satisfying the expressions (1) and (2) for at least one of the positive lens components among the positive lens components of the first lens unit, a secondary spectrum of axial chromatic aberration on the telephoto side can be well corrected. When the formulas (1) and (2) are not satisfied by the positive lens components of the first lens unit, the secondary spectrum of chromatic aberration on axis on the telephoto side increases.

In that case, to correct the increased chromatic aberration, the power of each lens unit must be decreased, or the number of lenses of the first lens unit must be increased. As a result, the diameters of the lenses become too large, or the number of the lens elements become too large, hindering the creation of small and lightweight zoom lenses, contrary to an object of the present invention.

In addition, if an attempt is made to correct the increased chromatic aberration by a lens unit other than the first lens unit, balancing of aberrations through the zoom range suffers, weakening imaging performance on the wide-angle side.

Furthermore, according to a preferred embodiment of the present invention, the first lens unit has at least one negative lens component, and the refractive index Nd– and the Abbe number υd– of at least one of the negative lens components among the negative lens components of the first lens unit satisfy the following conditions:

$$1.700 < Nd- \quad (3)$$

$$υd- < 35 \quad (4)$$

Additionally, in a preferred embodiment, the zoom lens with high performance imaging is formed with at least one lens surface in the first lens unit or the second lens unit being aspheric.

When at least one of the negative lenses of the first lens unit does not satisfy the conditions (3) and (4), the secondary spectrum of the chromatic aberration on axis in the maximum telephoto state increases.

As described above, by appropriately correcting chromatic aberration that is otherwise impossible to correct even with the use of an aspheric surface, higher quality imaging can be achieved.

In the zoom lens of the present invention, the first lens unit has a positive refractive power and the second lens unit has a negative refractive power.

In that case, to assist in the correction of aberrations in each lens unit, when an aspheric surface is in the first lens unit, it is preferable that the aspheric surface be formed so that the positive refractive power gradually decreases or the negative refractive power gradually increases from the optical axis toward the marginal zone compared to a spherical reference surface having a paraxial radius of curvature.

On the other hand, when the aspheric lens is in the second lens unit, it is preferable that the aspheric surface be formed so that the positive refractive power gradually increases or the negative refractive power gradually decreases from the optical axis towards the marginal zone in comparison with to a spherical reference surface having the same radius of curvature as the paraxial radius of curvature of the aspheric surface.

It is preferable that the aspheric surface be formed so that the negative refractive power gradually increases of the positive refractive power gradually decreases from the optical axis toward the marginal zone in comparison to a spherical reference surface having the same radius of curvature as the paraxial radius of the aspheric surface.

It is also preferable that the aspheric lens in the first lens unit or in the second lens unit satisfies the following condition (5):

$$10^{-4} \cdot h/2 < |dx5| < |dx7| < |dx10| < 10^{-1} \cdot h/2 \quad (5)$$

where
  h=maximum diameter of the aspheric lens,
  dx5=amount the aspheric surface at 50% of the diameter deviates from a paraxial spherical reference surface,
  dx7=amount the aspheric surface at 70% of the diameter deviates from the paraxial spherical reference surface, and
  dx10=amount the aspheric surface at 100% of the diameter deviates from the paraxial spherical reference surface.

In addition, the amount of aspheric surface means the distance parallel to the optical axis from the paraxial spherical reference surface to the aspheric surface of the aspheric lens.

The condition (5) determines the appropriate range of the amount of the aspheric surface to assist in producing the aspheric lenses with correction of aberrations.

When the aspheric lens surface is in the first lens unit, in accord with condition (5), as the aspheric amount of the aspheric surface at 100% of the diameter, $|dx10|$, exceeds the upper limit $10^{-1}xh/2$, the production of the aspheric lenses rapidly becomes more difficult. Conversely, in accord with condition (5), as the aspheric amount of the aspheric surface at 50% of the height of the maximum diameter, $|dx5|$, falls below the lower limit $10^{-4}xh/2$, the spherical aberration in the maximum telephoto state becomes increasingly under corrected.

On the other hand, when the aspheric lens is in the second lens unit, in accordance with condition (5), if the amount of the aspheric surface at 100% of the diameter, $|dx10|$, exceeds the upper limit $10^{-1}xh/2$, distortion increases from the middle focal length state to the maximum telephoto state. Conversely, in accord with condition (5), if the amount of the aspheric surface at 50% of the diameter, $|dx5|$, falls below the lower limit $10^{-4}xh/2$, aberrations vary to include large values with zooming, especially variations in the curvature of the image field, and the spherical aberration in the maximum telephoto state becomes over corrected.

Moreover, in the case in which the aspheric lens is in the first lens unit or the second lens unit, if the upper limit of condition (5) is exceeded, or if there is a falling below the lower limit thereof, variations in the spherical aberration or coma dramatically increase compared to the relationships of condition (5) being satisfied between the amount of the aspheric surface at 50% of the diameter, $|dx5|$, the amount of the aspheric surface at 70% of the diameter, $|dx7|$, and the amount of the aspheric surface at 100% of the diameter, $|dx10|$.

In addition, because the image plane position fluctuates in accordance with zooming of the zoom lens, all or a part of the third lens unit or the fourth lens unit should preferably be moved along the optical axis as a compensating lens unit for correcting the position of the image plane. That is because the required amount of movement of the first lens unit for correcting the position of the image plane increases with the diameter of the lens of the first lens group to too large a value.

Furthermore, in the present invention, it is preferred that the first lens unit and the second lens unit satisfy the following condition (6):

$$|f1/f2|^{1/2}/(\upsilon d2+-\upsilon d2-)<0.2 \qquad (6)$$

where
  f1=focal length of the first lens unit,
  f2=focal length of the second lens unit,
  $\upsilon d2+$=maximum Abbe number of all of the lens components of the second lens unit, and
  $\upsilon d2-$=minimum Abbe numbers of all of the lens components of the second lens unit.

If the upper limit of condition (6) is exceeded, variations in the chromatic aberration of magnification increases with zooming, making the correction of aberrations difficult. In that case, if the correction of the chromatic aberration of magnification which has large variations is attempted, the number of lens components has to be increased, or the power of each lens unit has to be decreased. In either case, it becomes difficult to make the zoom lens small and lightweight, and of high imaging performance, which are all objects of the present invention.

Furthermore, in the zoom lens according to the present invention, it is preferred that the following condition (7) additionally be satisfied in order to keep the Petzval's sum small:

$$0.5<|\beta 2\ W\cdot Zm^{1/2}|<2.5 \qquad (7)$$

where
  $\beta 2$ W=Magnification of the second lens unit at the maximum wide-angle state, and
  Zm=zoom ratio.

By satisfying condition (7), the zoom lens may be made small, and an increase in the Petzval's sum is prevented by reducing the power of the second lens unit.

In the present invention, with this type of zoom lens, the power of the second lens unit is greater than the power of any other lens unit. Because of this, weakening the negative power of the second lens unit as much as possible is the most effective method to maintain the Petzval's sum at an appropriate value.

That is, an increase in the Petzval's sum can be prevented by limiting the zooming range of the second lens unit to satisfy condition (7).

When the lower limit of condition (7) is exceeded, the increase in the Petzval's sum cannot be avoided because the power of the second lens unit becomes too great.

On the other hand, when the upper limit of condition (7) is exceeded, since the power of the second lens unit becomes too weak, the space for moving necessary for the zooming action of the second lens unit becomes large, and the total length of the lens system and the diameter of the front lens component increases. Moreover, compared to the amount of movement of the second lens unit at the time of zooming, the amount of movement of the correcting lens unit for correcting the fluctuation of the image plane (all or a part of the third lens unit or the fourth lens unit) becomes extremely large near the maximum telephoto state. As a result, the barrel mechanism for moving the second lens unit at both ends of the zoom range and the correcting lens unit for zooming becomes complicated and thus inconvenient.

Furthermore, when the first lens unit has a negative lens component, and at least one lens surface in the first lens unit is aspheric, the following condition (8) should be satisfied:

$$-1.0<(R2+R1)/(R2-R1)<-0.1 \qquad (8)$$

When the first lens unit has a negative lens component, and at least one lens surface in the second lens unit is aspheric, the following condition (9) should be satisfied:

$$-2.0<(R2+R1)/(R2-R1)<0 \qquad (9)$$

where
  R1=paraxial radius of curvature of the lens surface of the negative lens component closest to the object side, and
  R2=paraxial radius of curvature of the lens surface of the negative lens component closest to the image side.

The conditions (8) and (9) regulate an appropriate scope for the shape factor of the negative lens component in the first lens unit.

If the upper limit of the conditions (8) or (9) is exceeded, the spherical aberration on the telephoto side is under corrected. In this case, if the correction of the under corrected spherical aberration is attempted, the amount of the aspheric surface must be increased and thus the production of the aspheric surface becomes difficult.

On the other hand, if the lower limit of the conditional formula is exceeded, astigmatism increases.

BRIEF DESCRIPTION OF THE DRAWINGS

The invention will be described with reference to the following figures in which like references refer to like elements, and wherein.

DETAILED DESCRIPTION OF PREFERRED EMBODIMENTS

Figure 1:
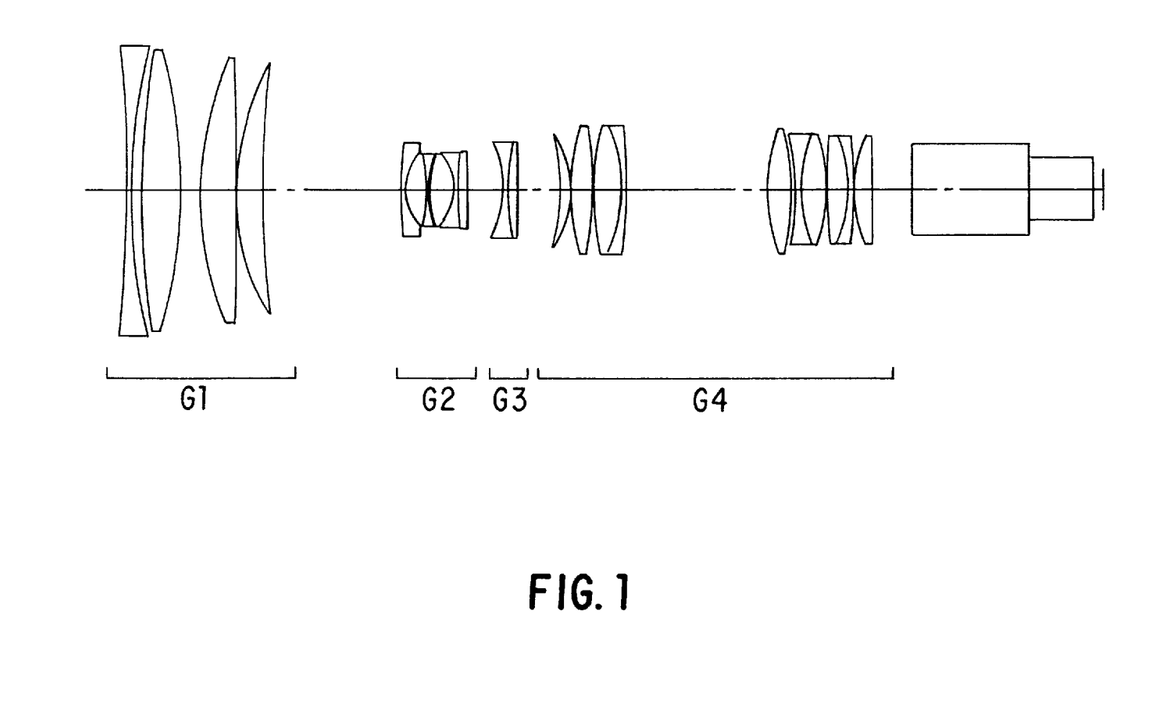
FIG. 1 is a side cross-section view of a zoom lens according to a first embodiment of the invention.

FIG. 1 is a side cross-section view of a zoom lens according to the first embodiment of the invention.

The zoom lens shown in FIG. 1 includes, from the object side, a first lens unit G1 having a biconcave lens, a biconvex lens, a biconvex lens, and a positive meniscus lens with its convex surface facing the object side; a second lens unit G2 having a negative meniscus lens with its convex surface facing the object side, a biconcave lens, and a cemented lens made up of a biconcave lens between two biconvex lenses; a third lens unit G3 having a negative refractive power and a cemented lens made up of a biconcave lens and a biconvex lens; and a fourth lens unit G4 having a positive meniscus lens with its concave surface facing the object side, a biconvex lens, a cemented lens made up of a biconvex lens and a negative meniscus lens with its concave surface facing the object side, a biconvex lens, a cemented lens made up of a biconcave lens and a biconvex lens, a cemented lens made up of a biconvex lens and a negative meniscus lens with its concave surface facing the object side, and a positive meniscus lens with its convex surface facing the object side.

In the first embodiment, the fourth lens unit G4 consists of two sub-units—a front sub-unit having, in order from object side, the positive meniscus lens, the biconvex lens, and the cemented lens and a rear sub-unit having, in order from object side, the biconvex lens, the two cemented lenses, and the positive meniscus lens. The first lens unit G1 through the front sub-unit of the fourth lens unit G4 forms a substantially afocal optical system.

Lens data of the first embodiment of the invention are listed in TABLE 1. In TABLE 1, the symbols f and Bf indicate the focal length and the back focus, respectively. In addition, lens surfaces are numbered from the object side along optical axis, and the refractive index and Abbe number indicate the values for the d line ($\lambda$=587.6 nm).

In addition, parallel sided flat plates, related to a color separation prism or various types of filters, are shown in FIG. 1 positioned between the surfaces of the lens closest to the image side and the image plane, and because aberrations are corrected based on including these parallel sided flat plates, the lens data of the parallel sided flat plates are also indicated.

The aspheric surface is represented by the following equation (a) where the height perpendicular to the optical axis is y; the distance parallel to the optical axis of the aspheric surface from a plane perpendicular to the optical axis at the point of intersection of the aspheric surface and the optical axis at the height y is S(y); the standard radius of curvature, that is, the radius of curvature at the vertex, is r; the conical coefficient is k; and the aspheric coefficient of the n-th order is $C_n$:

$$S(y) = (y^2/r)/\{1 + [1 - (1 + k) \cdot (y/r)^2]^{1/2}\} + \quad (a)$$

$$C_2 19 y^2 + C_4 \cdot y^4 + C_6 \cdot y^6 + C_8 + y^8 + C_{10} \cdot y^{10} + \ldots$$

In addition, the paraxial radius of curvature R is defined by the following equation (b):

$$R = 1/(2 \cdot C_2 + 1/r) \quad (b)$$

In TABLE 1, a symbol * is attached on the right side of the surface numbers of the aspheric lens surfaces.

TABLE 1 f = 8.5-40-125

| Surface Number | Radius of Curvature | Separation of Surfaces | Abbe Number | Refractive Index |
|---|---|---|---|---|
| 1 | −521.850 | 1.9 | 23.82 | 1.84666 |
| 2* | 171.883 | 2.8 | | |
| 3 | 249.002 | 9.4 | 95.57 | 1.43388 |
| 4 | −129.198 | 5.2 | | |
| 5 | 88.089 | 8.7 | 82.52 | 1.49782 |
| 6 | −865.713 | 0.1 | | |
| 7 | 62.166 | 7.4 | 52.30 | 1.74810 |
| 8 | 264.621 | (d8 variable) | | |
| 9 | 102.764 | 0.9 | 35.72 | 1.90265 |
| 10 | 14.019 | 5.5 | | |
| 11* | −44.791 | 0.9 | 52.30 | 1.74810 |
| 12 | 36.904 | 0.1 | | |
| 13 | 23.008 | 6.2 | 30.83 | 1.61750 |
| 14 | −13.647 | 0.9 | 46.54 | 1.80411 |
| 15 | 125.945 | 2.4 | 23.01 | 1.86074 |
| 16 | −122.500 | (d16 variable) | | |
| 17 | −24.915 | 0.9 | 52.30 | 1.74810 |
| 18 | 54.347 | 2.7 | 23.01 | 1.86074 |
| 19 | −400.129 | (d19 variable) | | |
| 20 | −68.073 | 3.6 | 65.77 | 1.46450 |
| 21 | −27.589 | 0.1 | | |
| 22 | 52.987 | 5.4 | 70.41 | 1.48749 |
| 23 | −88.727 | 0.1 | | |
| 24 | 65.278 | 7.1 | 56.41 | 1.50137 |
| 25 | −39.536 | 1.2 | 39.82 | 1.86994 |
| 26 | −175.382 | 36.3 | | |
| 27 | 45.758 | 6.0 | 65.77 | 1.46450 |
| 28 | −56.878 | 0.7 | | |
| 29 | −71.071 | 1.0 | 39.82 | 1.86994 |
| 30 | 32.743 | 7.3 | 70.41 | 1.48749 |
| 31 | −42.526 | 0.1 | | |
| 32 | 157.576 | 5.4 | 48.97 | 1.53172 |
| 33 | −29.546 | 1.0 | 39.82 | 1.86994 |
| 34 | −130.985 | 0.1 | | |
| 35 | 29.193 | 4.4 | 70.41 | 1.48749 |
| 36 | 396.495 | 10.0 | | |
| 37 | ∞ | 30.0 | 38.03 | 1.60342 |
| 38 | ∞ | 16.2 | 64.10 | 1.51680 |
| 39 | ∞ | Bf = 2.0238 | | |

(Aspheric Data)

| Surface Number | 2 | 11 |
|---|---|---|
| K | 1.0000 | 1.0000 |
| $c_2$ | 0.0000 | 0.0000 |
| $c_4$ | $1.69490 \times 10^{-7}$ | $8.09490 \times 10^{-6}$ |
| $c_6$ | $-7.45650 \times 10^{-12}$ | $-4.49290 \times 10^{-8}$ |
| $c_8$ | $8.91830 \times 10^{-15}$ | $4.6490 \times 10^{-10}$ |
| $c_{10}$ | 0.0000 | 0.0000 |

(Separations of Surfaces at Different Focal Lengths)

| f | 8.5 | 40.0 | 125.0 |
|---|---|---|---|
| d8 | 0.83 | 34.45 | 45.55 |
| d16 | 47.65 | 9.13 | 3.50 |
| d19 | 5.03 | 9.94 | 4.46 |

(Derived Lens Data)
f1=66.46
f2=−13.00
Zm=14.03
β2 W=−0.271

| Condition | Condition Satisfying Data |
|---|---|
| (1) | Nd+ = 1.43388 |
| (2) | υd+ = 95.57 |
| (3) | Nd− = 1.84666 |
| (4) | υd− = 23.82 |
| (5) | Surface 2 |
|  | h = 35.15 |
|  | $10^{-4}$xh/2 = 0.0018 |
|  | \|dx5\| = 0.0160 |
|  | \|dx7\| = 0.0583 |
|  | \|dx10\| = 0.2654 |
|  | $10^{-1}$xh/2 = 1.7575 |
| (5) | Surface 11 |
|  | h = 9.2 |
|  | $10^{-4}$xh/2 = 0.0005 |
|  | \|dx5\| = 0.0033 |
|  | \|dx7\| = 0.0131 |
|  | \|dx10\| = 0.0546 |
| (6) | $10^{-1}$xh/2 = 0.46 |
| (7) | \|f1/f2\|$^{1/2}$/(υd2+ − υd2−) = 0.077 |
| (8) | \|β2W · Zm$^{1/2}$\| = 1.025 |
|  | (R2 + R1)/(R2 − R1) = −0.504 |

Figure 2A:
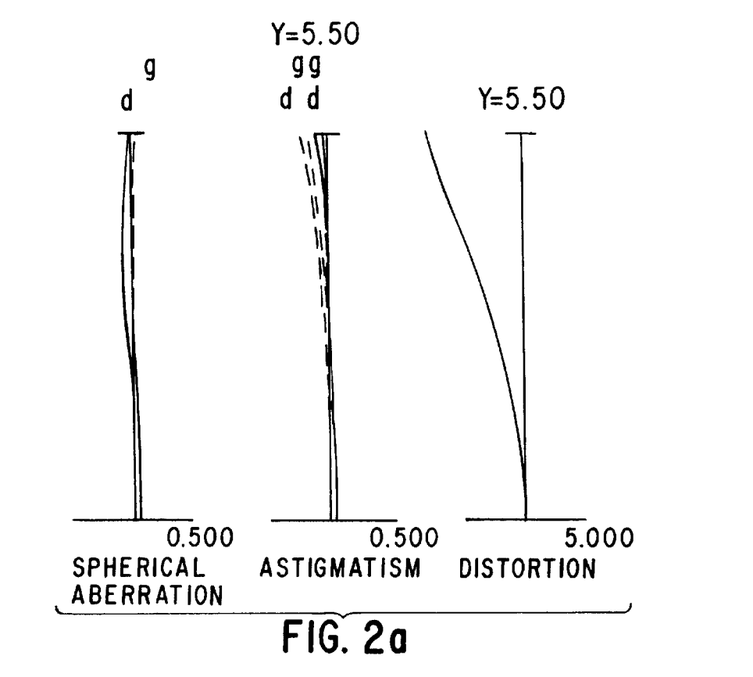
FIGS. 2(a)–2(c) are graphs of spherical aberration, astigmatism and distortion at the maximum wide-angle state, medium focal length state and maximum telephoto state, respectively, of the zoom lens of FIG. 1.
Figure 2B:
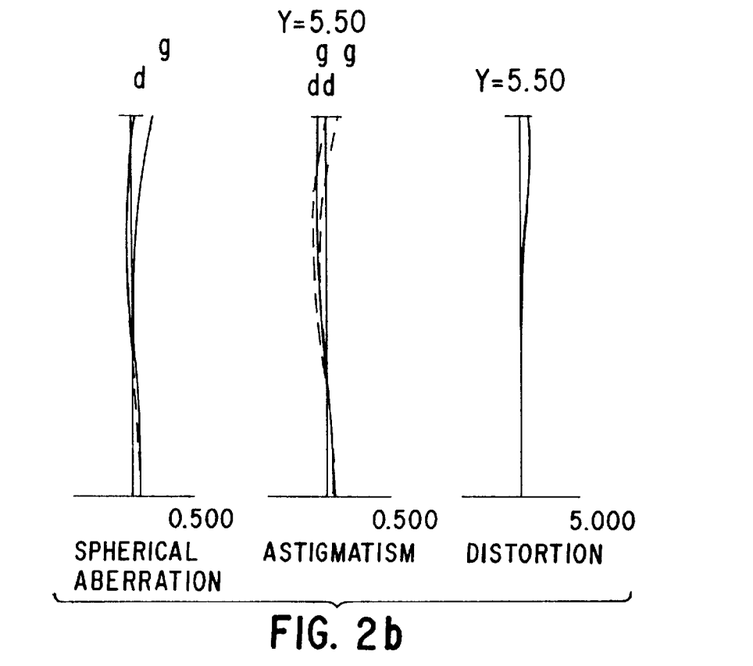
Figure 2C:
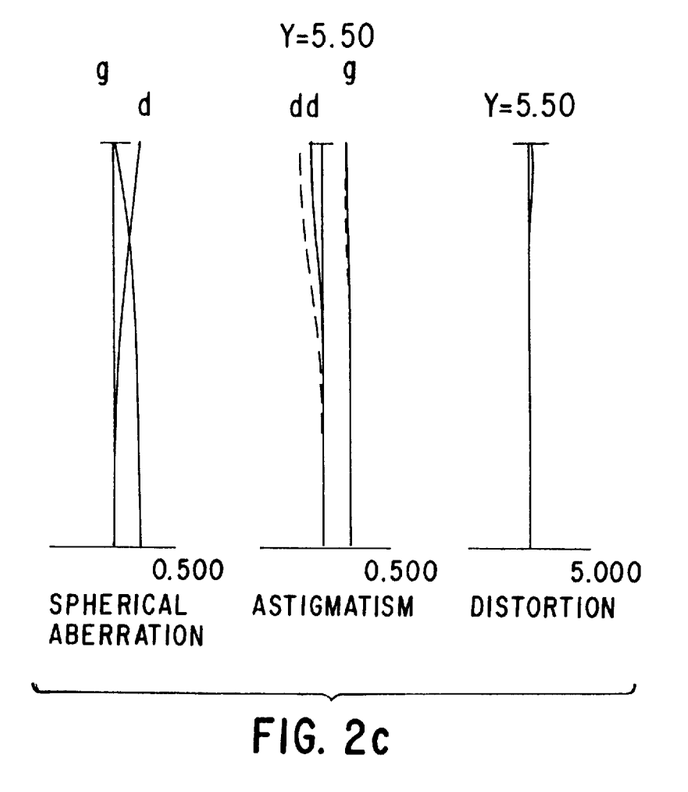

FIGS. 2(a)–2(c) are graphs of spherical aberration, astigmatism and distortion at the maximum wide-angle state, medium focal length state and maximum telephoto state, respectively, of the first embodiment.

In each of the graphs of FIGS. 2(a)–2(c), the letter Y indicates the image height, the letter d indicates the d line (λ=587.6 nm), and the letter g indicates the g line (λ=435.8 nm).

In addition, the solid lines indicate sagittal image planes and the broken lines indicate meridional image planes in the graphs of astigmatism. Moreover, in the graphs of spherical aberration, the broken lines indicates the sine condition.

As is obvious from the graphs of aberration, in the present embodiment, aberrations including chromatic aberration are well corrected at each focal length state. Chromatic aberration at the maximum telephoto state is especially well corrected.

Figure 3:
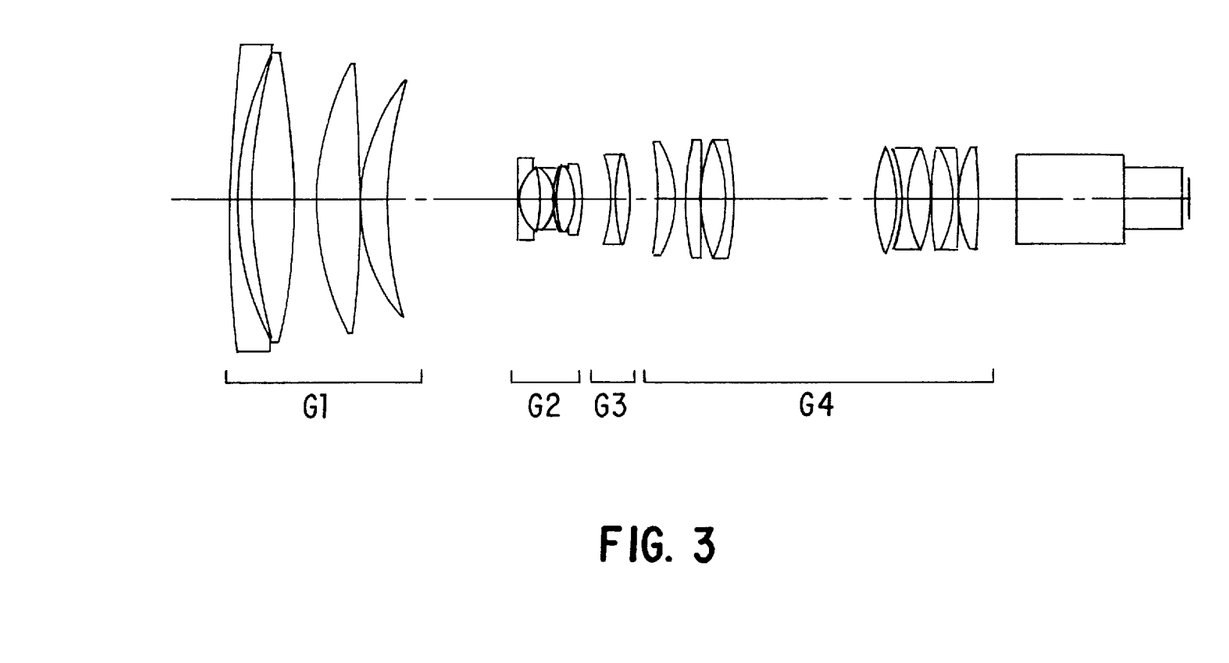
FIG. 3 is a side cross-sectional view of a zoom lens according to a second embodiment of the invention.

FIG. 3 is a side cross-sectional view of a zoom lens according to the second embodiment of the invention.

The zoom lens shown in FIG. 3 includes, from the object side, a first lens unit G1 having a negative meniscus lens with its convex surface facing the object side, a biconvex lens, a biconvex lens, and a positive meniscus lens with its convex surface facing the object side; the second lens unit G2 includes a negative meniscus lens with its convex surface facing the object side, a cemented lens made up of a negative meniscus lens with its concave surface facing the object side and a biconcave lens, a biconvex lens, and a negative meniscus lens with its concave surface facing the object; a third lens unit G3 having a negative refractive power and a cemented lens made up of a biconcave lens and a biconvex lens; and a fourth lens unit G4 having a positive meniscus lens with its concave surface facing the object side, a positive meniscus lens with its convex surface facing the object side, a cemented lens made up of a biconvex lens and a negative meniscus lens with its concave surface facing the object side, a biconvex lens, a cemented lens of a biconvex lens and a negative meniscus lens with its concave surface facing the object side, and a biconvex lens.

In the second embodiment, the fourth lens unit G4 consists of two sub-units—a front sub-unit having, in order from object side, the positive meniscus lens, the biconvex lens, and the cemented lens and a rear sub-unit having, in order from object side, the biconvex lens, the two cemented lenses, and the biconvex lens. The first lens unit G1 through the front sub-unit of the fourth lens unit G4 forms a substantially afocal optical system.

Lens data of the second embodiment of the invention are listed in TABLE 2. In TABLE 2, the symbols f and Bf indicate the focal length and the back focus, respectively. In addition, lens surfaces are numbered from the object side along the optical axis, and the refractive index and Abbe number indicate the values for the d line (λ=587.6 nm).

In addition, parallel sided flat plates, related to a color separation prism or various types of filters, are shown in FIG. 3 positioned between the surface of a lens closest to the image side and the image plane, and because the aberrations are corrected based on including these parallel sided flat plates, the values of the items of these paralleled flat plates are also indicated.

With regard to the second embodiment and TABLE 2, aspheric surface 14 is defined as set out previously with regard to the first embodiment and surface number 14 of TABLE 2 has a symbol * as set out previously with regard to TABLE 1.

TABLE 2 f = 8-80-125

| Surface Number | Radius of Curvature | Separation of Surfaces | Abbe Number | Refractive Index |
|---|---|---|---|---|
| 1 | 409.365 | 1.9 | 25.41 | 1.80518 |
| 2 | 92.615 | 4.8 |  |  |
| 3 | 137.974 | 10.9 | 95.57 | 1.43388 |
| 4 | −207.086 | 6.0 |  |  |
| 5 | 80.207 | 11.7 | 67.87 | 1.59319 |
| 6 | −481.269 | 0.1 |  |  |
| 7 | 51.041 | 7.7 | 67.87 | 1.59319 |
| 8 | 107.739 | (d8 variable) |  |  |
| 9 | 637.665 | 0.9 | 35.72 | 1.90265 |
| 10 | 12.289 | 5.0 |  |  |
| 11 | −50.387 | 3.8 | 23.01 | 1.86074 |
| 12 | −12.497 | 0.9 | 39.82 | 1.86994 |
| 13 | 82.759 | 0.1 |  |  |
| 14* | 54.009 | 4.5 | 30.83 | 1.61750 |
| 15 | −20.989 | 1.1 |  |  |
| 16 | −17.935 | 0.9 | 52.30 | 1.74810 |
| 17 | −48.075 | (d17 variable) |  |  |
| 18 | −26.355 | 0.9 | 43.35 | 1.84042 |
| 19 | 45.117 | 3.0 | 23.01 | 1.86074 |
| 20 | −116.784 | (d20 variable) |  |  |

TABLE 2-continued f = 8-80-125

| Surface Number | Radius of Curvature | Separation of Surfaces | Abbe Number | Refractive Index |
|---|---|---|---|---|
| 21 | −113.554 | 5.2 | 82.52 | 1.49782 |
| 22 | −28.413 | 3.0 | | |
| 23 | 65.165 | 4.2 | 65.77 | 1.46450 |
| 24 | 9953.265 | 0.1 | | |
| 25 | 46.340 | 7.3 | 65.77 | 1.46450 |
| 26 | −38.584 | 1.7 | 35.72 | 1.90265 |
| 27 | −90.594 | 39.0 | | |
| 28 | 42.553 | 6.2 | 65.77 | 1.46450 |
| 29 | −42.553 | 0.7 | | |
| 30 | −50.535 | 1.5 | 39.82 | 1.86994 |
| 31 | 27.853 | 6.5 | 58.90 | 1.51823 |
| 32 | −57.666 | 0.1 | | |
| 33 | 83.763 | 6.2 | 45.87 | 1.54814 |
| 34 | −31.209 | 1.5 | 39.82 | 1.86994 |
| 35 | −243.372 | 0.1 | | |
| 36 | 31.669 | 5.2 | 65.77 | 1.46450 |
| 37 | −143.790 | 10.0 | | |
| 38 | ∞ | 30.0 | 38.03 | 1.60342 |
| 39 | ∞ | 16.2 | 64.10 | 1.51680 |
| 40 | ∞ | Bf = 1.3317 | | |

(Aspheric Data)

| | k | $C_2$ | $C_4$ |
|---|---|---|---|
| Surface 14 | 3.1603 | 0.0000 | $3.39100 \times 10$ |
| Number | $C_6$ | $C_8$ | $C_{10}$ |
| | $3.38040 \times 10^{-8}$ | $3.76290 \times 10^{-10}$ | $-1.45920 \times 10^{-12}$ |

(Separations of Surfaces at Different Focal Lengths)

| f | 8.0 | 80.0 | 125.0 |
|---|---|---|---|
| d8 | 0.58 | 43.41 | 48.04 |
| d17 | 50.32 | 1.87 | 3.65 |
| d20 | 1.86 | 7.47 | 1.07 |

(Derived Lens Data)
f1=68.77
f2=−11.73
Zm=19.3
β2 W=−0.235

| Condition | Condition Satisfying Data |
|---|---|
| (1) | Nd+ = 1.43388 |
| (2) | υd+ = 95.57 |
| (3) | Nd− = 1.80518 |
| (4) | υd− = 25.41 |
| (5) | Surface 14 |
| | h = 8.8 |
| | $10^{-4}xh/2 = 0.0004$ |
| | $|dx5| = 0.0135$ |
| | $|dx7| = 0.0573$ |
| | $|dx10| = 0.2301$ |
| (6) | $10^{-1}xh/2 = 0.44$ |
| (7) | $|f1/f2|^{1/2}/(υd2+ - υd2-) = 0.083$ |
| (8) | $|β2W \cdot Zm^{1/2}| = 1.032$ |
| | (R2 + R1)/(R2 − R1) = −1.585 |

Figure 4A:
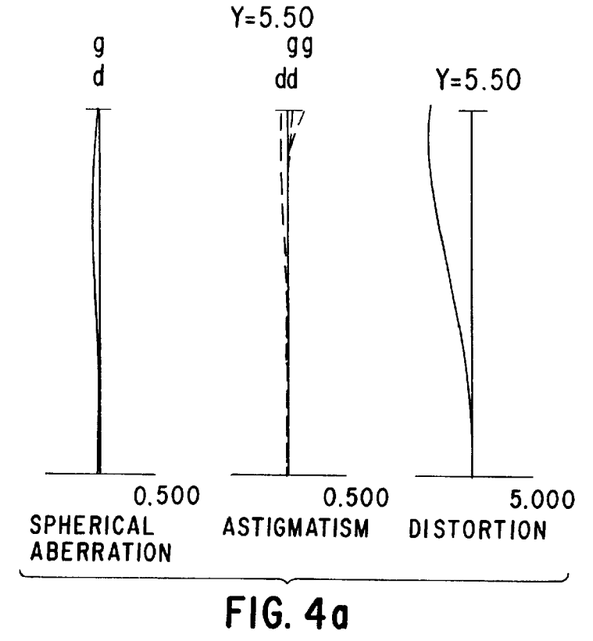
FIGS. 4(a)–4(c) are graphs of spherical aberration, astigmatism and distortion at the maximum wide angle state, medium focal lengthortate and maximum telephoto state, respectively, of the zoom lens of FIG. 3.
Figure 4B:
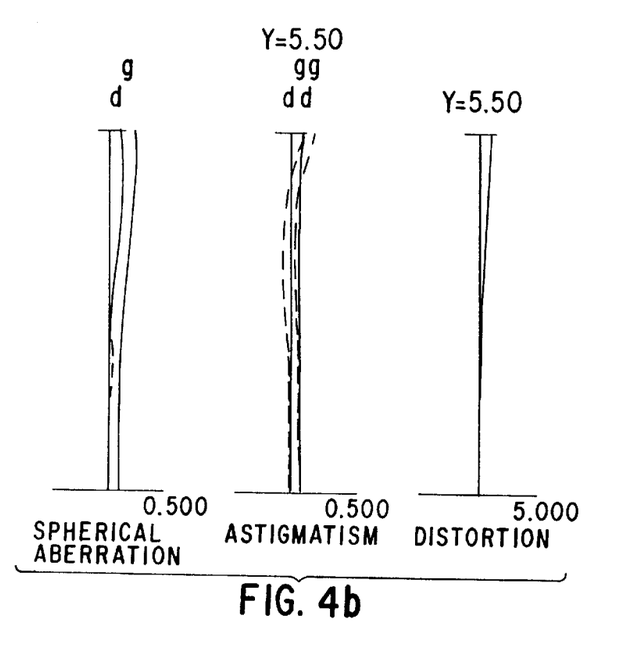
Figure 4C:
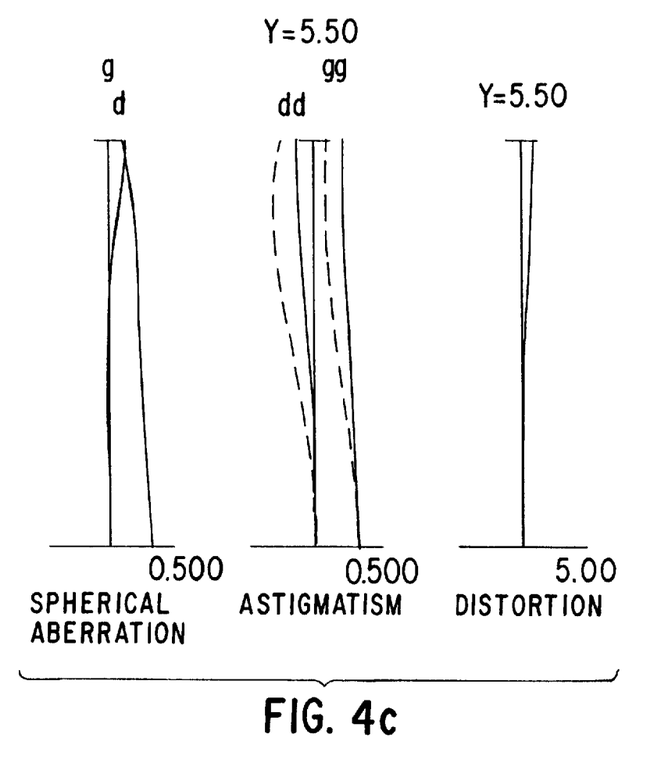

FIGS. 4(a)–4(c) are graphs of spherical aberration, astigmatism and distortion at the maximum wide-angle state, medium focal length state and maximum telephoto state, respectively, of the second embodiment.

In each of the graphs of FIGS. 4(a)–4(c), the letter Y indicates the image height, the letter d indicates the d line (λ=587.6 nm), and the letter g indicates the g line (λ=435.8 nm).

In addition, the solid lines indicate sagittal image planes and the broken lines indicate meridional image planes in the graphs of astigmatism. Moreover, in the graphs of spherical aberration, the broken lines indicates the sine condition.

As is obvious from the graphs of aberration, in the present embodiment, aberrations including chromatic aberration are well corrected at each focal length state. Chromatic aberration at the maximum telephoto state is especially well corrected.

In the first and second embodiment, the third lens unit G3 moves along optical axis to compensate for axial movement of the image caused by moving the second lens unit G2. It is also possible to compensate by axial moving the front sub-unit of the fourth lens unit G4, the rear sub-unit of the fourth lens unit G4, or both the front and rear sub-unit of fourth lens unit G4 instead of the third lens unit G3. It is also possible that the third lens unit have a positive refractive power to compensate for axial movement of the image caused by moving the second lens unit G2 instead of the third lens unit having negative power.

As explained above, according to the invention, a zoom lens can be realized which is small and lightweight and with high image quality, a large aperture and a large zoom ratio.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A zoom lens comprising in order from an object side:

a first lens unit that is stationary during zooming and has positive power, wherein said first lens unit includes a positive lens component having a refractive index Nd+ and an Abbe number υd+ satisfying the following conditions:

$$Nd+ < 1.437$$

$$95 < υd+;$$

at least one surface of said first lens unit being aspheric, the power of said aspheric lens surface being less positive or more negative with increasing distance from the optical axis and said aspheric lens surface satisfies the following condition:

$$10^{-4} \times h/2 < \frac{1}{2} dx5\frac{1}{2} < \frac{1}{2} dx7\frac{1}{2} < \frac{1}{2} dx10\frac{1}{2} < 10^{-1} \times h/2$$

where h=diameter of said aspheric lens, dx5=amount said aspheric surface at 50% of said diameter deviates from a paraxial spherical reference surface, dx7=amount said aspheric surface at 70% of said diameter deviates from said paraxial spherical reference surface, and dx10=amount said aspheric surface at 100% of said diameter deviates from said paraxial spherical reference surface;

a second lens unit that moves along the optical axis during zooming and that has negative power; and a third lens unit.

2. A zoom lens comprising in order from an object side:
a first lens unit that is stationary during zooming and has positive power, wherein said first lens unit includes a positive lens component having a refractive index Nd+ and an Abbe number υd+ satisfying the following conditions:

$$Nd+ < 1.437$$

$$95 < \upsilon d+;$$

at least one surface of said second lens unit being aspheric, the power of said aspheric lens surface being less positive or more negative with increasing distance from the optical axis and said aspheric surface satisfies the following condition:

$$10^{-4} \times h/2 < \frac{1}{2} dx5\frac{1}{2} < \frac{1}{2} dx7\frac{1}{2} < \frac{1}{2} dx10\frac{1}{2} < 10^{-1} \times h/2$$

where
h=diameter of said aspheric lens,
dx5=amount said aspheric surface at 50% of said diameter deviates from a paraxial spherical reference surface,
dx7=amount said aspheric surface at 70% of said diameter deviates from said paraxial spherical reference surface,
dx10=amount said aspheric surface at 100% of the diameter deviates from said paraxial spherical reference surface;
a second lens unit that moves along the optical axis during zooming and that has negative power; and
a third lens unit.

3. A zoom lens comprising in order from an object side:
a first lens unit that is stationary during zooming and has positive power, wherein said first lens unit includes a positive lens component having a refractive index Nd+ and an Abbe number υd+ satisfying the following conditions:

$$Nd+ < 1.437$$

$$95 < \upsilon d+;$$

a second lens unit that moves along the optical axis during zooming and that has negative power;
at least one lens surface of said first lens unit or said second lens unit being aspheric;
a third lens unit; and
a fourth lens unit that is movable along the optical axis during zooming.

4. The zoom lens of claim 1, wherein the following condition is satisfied:

$$|f1/f2|^{1/2}/(\upsilon d2+ - \upsilon d2-) < 0.2$$

where
f1=focal length of said first lens unit,
f2=focal length of said second lens unit,
υd2+=maximum Abbe number of all of the lens components of said second lens unit, and
υd2−=minimum Abbe number of all of the lens components of said second lens unit.

5. The zoom lens of claim 1, wherein the following condition is satisfied:

$$0.5 < |\beta 2 \cdot W \cdot Zm^{1/2}| < 2.5$$

where
β2 W=magnification of said second lens unit at the maximum wide-angle state of the zoom lens, and
Zm=zoom ratio of the zoom lens.

6. The zoom lens of claim 1, wherein said aspheric lens surface is a lens surface of an aspheric lens of said first lens unit and said first lens unit comprises a negative lens component that satisfies the following condition:

$$-1.0 < (R2+R1)/(R2-R1) < -0.1$$

where
R1=paraxial radius of curvature of the object side surface of said negative lens component, and
R2=paraxial radius of curvature of the image side surface of said negative lens component.

7. The zoom lens of claim 2, wherein said aspheric lens surface is a lens surface of an aspheric lens of said second lens unit and said first lens unit comprises a negative lens component that satisfies the following paraxial radius condition:

$$-2.0 < (R2+R1)/(R2-R1) < 0$$

where
R1=paraxial radius of curvature of the object side surface of said negative lens component, and
R2=paraxial radius of curvature of the image side surface of said negative lens component.

8. A zoom lens, comprising in order from an object side:
a first lens unit that is stationary during zooming and has a positive power, wherein said first lens unit includes at least a positive lens component having a refractive index Nd+ and an Abbe number υd+ satisfying the following conditions:

$$Nd+ < 1.437$$

$$95 < \upsilon d+, \text{ and}$$

includes at least a negative lens component having a refractive index Nd− and an Abbe number υd− satisfying the following conditions:

$$1,700 < Nd-$$

$$\upsilon d- < 35;$$

a second lens unit that moves along the optical axis during zooming and that has negative power;
a third lens unit having a negative refractivity; and
a fourth lens unit has a positive refractive power;
wherein said first lens unit includes an aspheric lens surface and the power of said aspheric lens surface being less positive or more negative with increasing distance from the optical axis and said aspheric lens surface satisfies the following condition:

$$10^{-4} \times h/2 < |dx5| < |dx7| < |dx10| < 10^{-1} \times h/2$$

where h=diameter of said aspheric lens, dx5=amount said aspheric surface at 50% of said diameter deviates from a paraxial spherical reference surface, dx7=amount said aspheric surface at 70% of said diameter deviates from said paraxial spherical reference surface, and dx10=amount said aspheric surface at 100% of said diameter deviates from said paraxial spherical reference surface.

9. The zoom lens of claim 8, wherein said third lens unit is movable along the optical axis during zooming.

10. The zoom lens of claim 8, wherein said fourth lens unit is movable along the optical axis during zooming.

11. The zoom lens of claim 10, wherein said fourth lens unit includes a sub-unit that is movable along the optical axis during zooming.

12. The zoom lens of claim 8, wherein the following condition is satisfied:

$$|f1/f2|^{1/2}/(\upsilon d2+ - \upsilon d2-) < 0.2$$

where f1=focal length of said first lens unit, f2=focal length of said second lens unit, υd2+=maximum Abbe number of all of the lens components of said second lens unit, and υvd2−=minimum Abbe number of all of the lens components of said second lens unit.

13. The zoom lens of claim 8, wherein the following condition is satisfied:

$$0.5 < |\beta 2\ W \cdot Zm^{1/2}| < 2.5$$

where

β2 W=magnification of said second lens unit at the maximum wide-angle state of the zoom lens, and Zm=zoom ratio of the zoom lens.

14. The zoom lens of claim 13, wherein said first lens unit has a negative lens component that satisfies the following condition:

$$-1.0 < (R2+R1)/(R2-R1) < -0.1$$

where

R1=paraxial radius of curvature of the object side surface of said negative lens component, and R2=paraxial radius of curvature of the image side surface of said negative lens component.

15. A zoom lens, comprising in order from an object side:

a first lens unit that is stationary during zooming and has a positive power, wherein said first lens unit includes at least a positive lens component having a refractive index Nd+ and an Abbe number υd+ satisfying the following conditions:

$$Nd+ < 1.437$$

$$95 < \upsilon d+, \text{ and}$$

includes at least a negative lens component having a refractive index Nd− and an Abbe number υd− satisfying the following conditions:

$$1.700 < Nd-$$

$$\upsilon d- < 35$$

a second lens unit that moves along the optical axis during zooming and that has negative power;

a third lens unit having a negative refractivity; and a fourth lens unit has a positive refractive power;

wherein said second lens unit includes an aspheric lens surface and the power of said aspheric lens surface being more positive or less negative with increasing distance from the optical axis and said aspheric lens surface satisfies the following condition:

$$10^{-4} \times h/2 < |dx5| < |dx7| < |dx10| < 10^{-1} \times h/2$$

where h=diameter of said aspheric lens, dx5=amount said aspheric surface at 50% of said diameter deviates from a paraxial spherical reference surface, dx7=amount said aspheric surface at 70% of said diameter deviates from said paraxial spherical reference surface, and dx10=amount said aspheric surface at 100% of said diameter deviates from said paraxial spherical reference surface.

16. The zoom lens of claim 15, wherein said third lens unit is movable along the optical axis during zooming.

17. The zoom lens of claim 15, wherein said fourth lens unit is movable along the optical axis during zooming.

18. The zoom lens of claim 15, wherein said fourth lens unit has a sub-unit that is movable along the optical axis during zooming.

19. The zoom lens of claim 15, wherein the following condition is satisfied:

$$|f1/f2|^{1/2}/(\upsilon d2+ - \upsilon d2-) < 0.2$$

where f1=focal length of said first lens unit, f2=focal length of said second lens unit, υd2+=maximum Abbe number of all of the lens components of said second lens unit, and υd2−=minimum Abbe number of all of the lens components of said second lens unit.

20. The zoom lens of claim 15, wherein the following condition is satisfied:

$$0.5 < |\beta 2\ W \cdot Zm^{1/2}| < 2.5$$

where

β2 W=magnification of said second lens unit at the maximum wide-angle state of the zoom lens, and Zm=zoom ratio of the zoom lens.

21. The zoom lens of claim 15, wherein said first lens unit consists of spherical lens components and includes a negative spherical lens component that satisfies the following condition:

$$-2.0<(R2+R1)/(R2-R1)<0$$

where
R1=paraxial radius of curvature of the object side surface of said negative lens component, and
R2=paraxial radius of curvature of the image side surface of said negative lens component.

22. A zoom lens, comprising in order from an object side:
a first lens unit that is stationary during zooming and has a positive power, wherein said first lens unit includes at least a positive lens component having a refractive index Nd+ and an Abbe number υd+ satisfying the following conditions:

$$Nd+<1.437$$
$$95<υd+, \text{ and}$$

includes at least a negative lens component having a refractive index Nd− and an Abbe number υd− satisfying the following conditions:

$$1.700<Nd-$$
$$υd-<35;$$

a second lens unit that moves along the optical axis during zooming and that has negative power;
a third lens unit having a negative refractivity; and
a fourth lens unit has a positive refractive power;
wherein said first lens unit includes an aspheric lens surface and the power of said aspheric lens surface being less positive or more negative with increasing distance from the optical axis, said second lens unit includes an aspheric lens surface and the power of said aspheric lens surface being more positive or less negative with increasing distance from the optical axis, and said aspheric lens surfaces satisfy the following condition:

$$10^{-4} \times h/2 < |dx5| < |dx7| < |dx10| < 10^{-1} \times h/2$$

where
h=diameter of said aspheric lens,
dx5=amount said aspheric surface at 50% of said diameter deviates from a paraxial spherical reference surface,
dx7=amount said aspheric surface at 70% of said diameter deviates from said paraxial spherical reference surface, and
dx10=amount said aspheric surface at 100% of said diameter deviates from said paraxial spherical reference surface.

23. The zoom lens of claim 22, wherein said third lens unit is movable along the optical axis during zooming.

24. The zoom lens of claim 22, wherein said fourth lens unit is movable along the optical axis during zooming.

25. The zoom lens of claim 22, wherein said fourth lens unit includes a sub-unit that is movable along the optical axis during zooming.

26. The zoom lens of claim 22, wherein the following condition is satisfied:

$$|f1/f2|^{1/2}/(υd2+-υd2-)<0.2$$

where
f1=focal length of said first lens unit,
f2=focal length of said second lens unit,
υd2+=maximum Abbe number of all of the lens components of said second lens unit, and
υd2−=minimum Abbe number of all of the lens components of said second lens unit.

27. The zoom lens of claim 22, wherein the following condition is satisfied:

$$0.5<|\beta 2 \cdot W \cdot Zm^{1/2}|<2.5$$

where
β2 W=magnification of said second lens unit at the maximum wide-angle state of the zoom lens, and
Zm=zoom ratio of the zoom lens.

28. The zoom lens of claim 22, wherein said first lens unit has a negative lens component that satisfies the following condition:

$$-1.0<(R2+R1)/(R2-R1)<-0.1$$

where
R1=paraxial radius of curvature of the object side surface of said negative lens component, and
R2=paraxial radius of curvature of the image side surface of said negative lens component.

29. A zoom lens comprising in order from an object side:
a first lens unit that is stationary during zooming and has positive power, wherein said first lens unit includes a positive lens component having a refractive index Nd+ and an Abbe number n d+ satisfying the following conditions:

$$Nd+<1.437$$
$$95<nd+;$$

at least one surface of said first lens unit being aspheric, the power of said aspheric lens surface being less positive or more negative with increasing distance from the optical axis and said aspheric lens surface satisfies the following condition:

$$10^{-4} \times h/2 < \tfrac{1}{2} dx5\tfrac{1}{2} < \tfrac{1}{2} dx7\tfrac{1}{2} < \tfrac{1}{2} dx10\tfrac{1}{2} < 10^{-1} \times h/2$$

where
h=diameter of said aspheric lens,
dx5=amount said aspheric surface at 50% of said diameter deviates from a paraxial spherical reference surface,
dx7=amount said aspheric surface at 70% of said diameter deviates from said paraxial spherical reference surface, and
dx10=amount said aspheric surface at 100% of said diameter deviates from said paraxial spherical reference surface;
a second lens unit that moves along the optical axis for zooming and that has negative power;

a third lens unit that moves along the optical axis during zooming; and a fourth lens unit that includes a front positive sub-unit and a rear positive sub-unit wherein said first lens unit through said front sub-unit of the fourth lens unit substantially constitute an afocal system.

30. A zoom lens comprising in order from an object side:

a first lens unit that is stationary during zooming and has positive power, wherein said first lens unit includes a positive lens component having a refractive index Nd+ and an Abbe number n d+ satisfying the following conditions:

$$Nd+ < 1.437$$

$$95 < nd+;$$

at least one surface of said second lens unit being aspheric, the power of said aspheric lens surface being more positive or less negative with increasing distance from the optical axis and said aspheric surface satisfies the following condition:

$$10^{-4} \times h/2 < \frac{1}{2} dx5\frac{1}{2} < \frac{1}{2} dx7\frac{1}{2} < \frac{1}{2} dx10\frac{1}{2} < 10^{-1} \times h/2$$

where h=diameter of said aspheric lens, dx5=amount said aspheric surface at 50% of said diameter deviates from a paraxial spherical reference surface, dx7=amount said aspheric surface at 70% of said diameter deviates from said paraxial spherical reference surface, and dx10=amount said aspheric surface at 100% of said diameter deviates from said paraxial spherical reference surface;

a second lens unit that moves along the optical axis for zooming and that has negative power;

a third lens unit that moves along the optical axis during zooming; and a fourth lens unit that includes a front positive sub-unit and a rear positive sub-unit wherein said first lens unit through said front sub-unit of the fourth lens unit substantially constitute an afocal system.

31. The zoom lens of claim 2, wherein the following condition is satisfied:

$$|f1/f2|^{1/2}/(\upsilon d2+ -\upsilon d2-) < 0.2$$

where f1=focal length of said first lens unit, f2=focal length of said second lens unit, υd2+=maximum Abbe number of all of the lens components of said second lens unit, and υd2−=minimum Abbe number of all of the lens components of said second lens unit.

32. The zoom lens of claim 2, wherein the following condition is satisfied:

$$0.5 < |\beta 2 \ W \cdot Zm^{1/2}| < 2.5$$

where

β2 W=magnification of said second lens unit at the maximum wide-angle state of the zoom lens, and Zm=zoom ratio of the zoom lens.

33. The zoom lens of claim 29, wherein said first lens unit includes at least one negative lens component having a refractive index Nd− and an Abbe number υd− satisfying the following conditions:

$$1.700 < Nd-$$

$$\upsilon d- < 35.$$

34. The zoom lens of claim 33, wherein the following condition is satisfied:

$$|f1/f2|^{1/2}/(\upsilon d2+ -\upsilon d2-) < 0.2$$

where f1=focal length of said first lens unit, f2=focal length of said second lens unit, υd2+=maximum Abbe number of all of the lens components of said second lens unit, and υd2−=minimum Abbe number of all of the lens components of said second lens unit.

35. The zoom lens of claim 30, wherein said first lens unit includes at least one negative lens component having a refractive index Nd− and an Abbe number υd− satisfying the following conditions:

$$1.700 < Nd-$$

$$\upsilon d- < 35.$$

36. The zoom lens of claim 35, wherein the following condition is satisfied:

$$|f1/f2|^{1/2}/(\upsilon d2+ -\upsilon d2-) < 0.2$$

where f1=focal length of said first lens unit, f2=focal length of said second lens unit, υd2+=maximum Abbe number of all of the lens components of said second lens unit, and υd2−=minimum Abbe number of all of the lens components of said second lens unit.

* * * * *